E. LAWSON.
HEMP GATHERER.
APPLICATION FILED FEB. 1, 1919.
1,311,407.
Patented July 29, 1919.
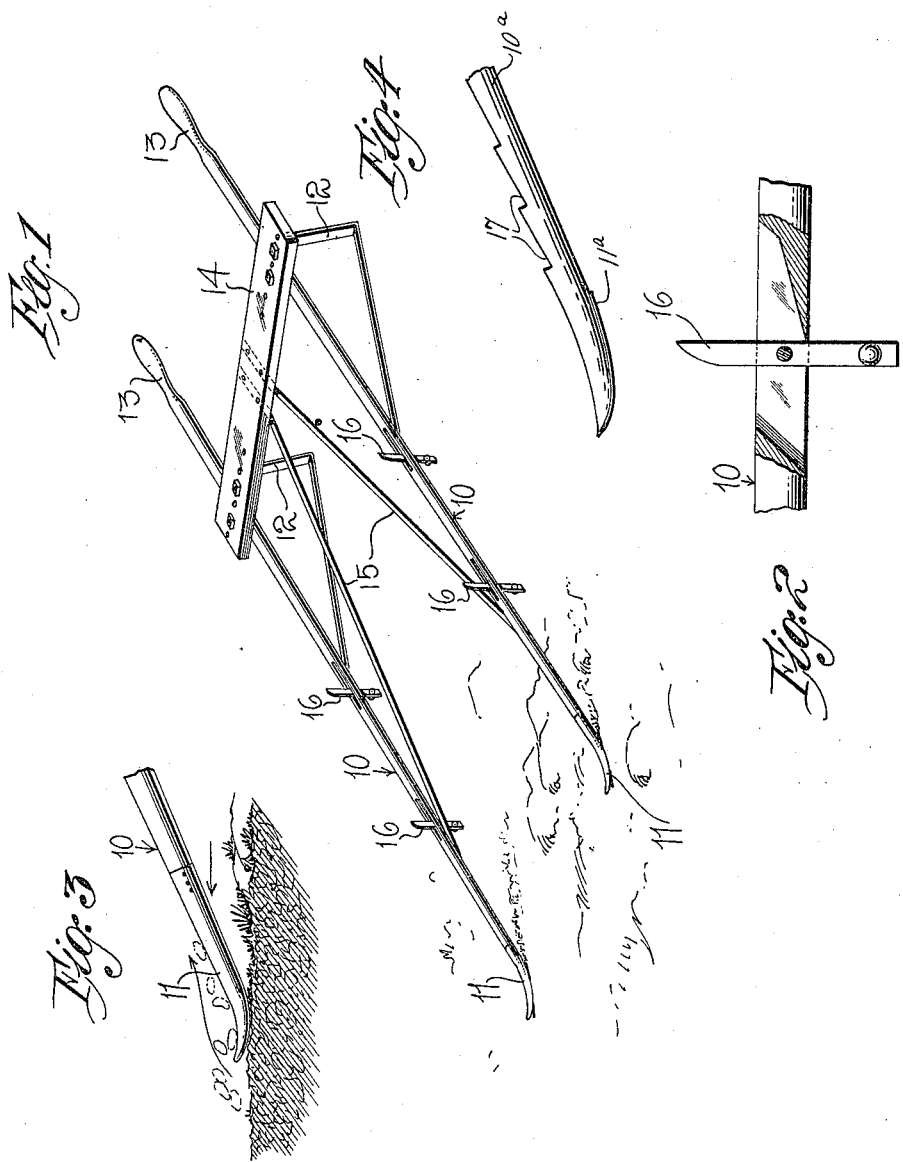
Inventor
E. Lawson
By Watson E. Coleman
Attorney

UNITED STATES PATENT OFFICE.

EDWARD LAWSON, OF EL DORADO, WISCONSIN.

HEMP-GATHERER.

1,311,407.  Specification of Letters Patent.  Patented July 29, 1919.

Application filed February 1, 1919. Serial No. 274,450.

*To all whom it may concern:*

Be it known that I, EDWARD LAWSON, a citizen of the United States, residing at El Dorado, in the county of Fon du Lac and State of Wisconsin, have invented certain new and useful Improvements in Hemp-Gatherers, of which the following is a specification, reference being had to the accompanying drawings.

This invention relates to devices for gathering hemp or like stalks into bundles.

The general object of the invention is to provide a device of this character in the nature of an inclined frame adapted to be inserted beneath the stalks so as to cause the stalks to ride up on the inclined frame, the inclined frame being provided with means for holding the stalks from retrograde or downward movement, said frame permitting the gathering of the stalks and the eventual bundling of the stalks.

A further object is to provide a device of this character which will not bruise or injure the hemp.

Other objects will appear in the course of the following description.

My invention is illustrated in the accompanying drawings, wherein:—

Figure 1 is a perspective view of my gatherer;

Fig. 2 is a fragmentary longitudinal sectional view of one of the rods or bars 10;

Fig. 3 is a fragmentary side elevation of the lower end of one of the bars 10; and Fig. 4 is a fragmentary side elevation of the gatherer showing a modified construction of the members 10.

Referring to these figures, it will be seen that my device comprises two longitudinally extending, downwardly inclined bars designated 10, the lower extremities of these bars being formed with upwardly curved shoes 11, preferably of metal. Adjacent the rear ends of the bars, there are provided the downwardly extending legs 12 which have upwardly and forwardly extending portions and the bars terminate in the handles 13 rearward of the legs. A brace 14 connects the bars 10 forward of the handles, this brace being disposed upon the under sides of the bars and a plurality of rods 15 extend rearward convergently from the rods, the rear ends of these rods 15 being mounted upon a brace. Mounted upon the bars 10 are a plurality of catches in the nature of pawls, which are designated 16, these being pivoted upon the bars and each catch or pawl having that portion below the pivot of greater weight than the portion above the pivot. These catches, therefore, permit the passage of stalks up the bars but will not permit the downward movement or retrograde movement of the stalks. Of course the catches are prevented from reverse movement, that is, the upper ends of the catches cannot move downward to a lower position where the catches are at right angles to the bars.

In the actual use of this invention, the frame is lifted and run along so that the shoes 11 slip under the hemp stalks as they lie on the ground and thus the hemp stalks are carried onto the bars and this is continued until sufficient stalks have been gathered upon the bars to form a bundle. Then the frame is lowered and the bundle gathered up and tied. It will be noted that the curved shoes permit the device to be readily slid along beneath the spread hemp and these shoes will not bruise or run over the hemp or run into the ground. This device permits one man to gather two or three cars of spread hemp a day without stooping. Gathering hemp is relatively hard work because of the constant necessity of stooping and rising. This device does away with this inconvenience.

In Figs. 1, 2 and 3 I have shown one form of my invention, but it is obvious that the device may be modified in many ways without departing from the spirit of the invention. Thus, for instance, in Fig. 4, I show a construction in which the rods 10ª have serrated upper faces 17, each of the teeth formed by serrating the rod having one face extending upward and rearward and the other face of the tooth extending directly downward. In other words, these serrations are formed by ratchet teeth extending along the top edge of each rod 10 and these ratchet teeth act to permit the hemp stalks to pass upward on the rods 10 but prevent its downward or retrograde movement. While I have illustrated in Fig. 3 the lower end of each rod 10 as being provided with a metallic member 11 which is attached to the lower end of the rod and forms a continuation of it, it will be obvious that, as shown in Fig. 4, this shoe might be simply a strip of metal attached to the under face of the rod 10. Such a shoe is illustrated in Fig. 4 and designated 11ª. The brace 14 is intended to be connected to the rods 10 by bolts or other suitable fastenings so that the rods 10 may be shifted or adjusted toward or from each other to thus decrease or increase the distance between the rods depending upon the height of the stalks of hemp being cut. It is obvious that in place of having the rods 10 adjustable upon the member 14, members 14 of different lengths might be used and substituted one for another when requisite.

I claim:—

1. A gatherer of the character described comprising downwardly and forwardly extending bars having upwardly curved shoes at their lower ends adapted to ride upon the ground and beneath the spread hemp, legs adjacent the rear ends of the bars, and means disposed at intervals along the bars for preventing downward movement of the gathered hemp but permitting upward movement thereof.

2. A hemp gatherer comprising downwardly and forwardly extending bars having upwardly and forwardly curved shoes at their lower ends, legs depending from said bars adjacent their rear ends, a brace connecting the bars and spacing them from each other, a plurality of upwardly and rearwardly converging rods attached to the bars and at their upper ends attached to the brace, and catches mounted at intervals along the bars permitting the outward movement of the hemp on the bars but preventing its downward movement.

3. A hemp gatherer comprising parallel downwardly extending rods adapted at their lower ends to ride over the ground, a brace operatively connecting the upper ends of said rods and holding them in spaced relation, the rods being adjustable transversely of the brace whereby to increase or decrease the distance between said rods, and said rods being formed with means whereby to impede the downward movement of the stalks gathered thereon but permit the free upward movement of the stalks.

4. A hemp gatherer comprising approximately parallel, downwardly extending rods formed at their lower ends to ride over the ground, a relatively thin brace operatively connecting the rods, the rods projecting beyond said brace to form handles, said brace holding the rods in spaced parallel relation, longitudinally extending braces connecting the rods to said first named brace and disposed in the same plane as the downwardly extending rods, legs extending downward from the rods adjacent their rear ends whereby the gatherer may be rotated and rested on the ground with the rods in an inclined position, and means disposed at intervals along the rods permitting the upward movement of material on the rod, but preventing the downward movement thereof.

5. A hemp gatherer comprising downwardly and forwardly extending bars adapted at their forward ends to ride over the ground and beneath the spread hemp, the bars being formed with legs adjacent their rear ends, the rear ends of the bars constituting handles, means holding the bars in spaced relation to each other, and a plurality of catches mounted at intervals on each bar, the bars being slotted, and the catches extending through said slots and being pivoted to the bar and normally swinging into a vertical position, and means permitting the rotative movement of the catches in a direction to cause the upper ends of the catches to move downward and rearward but preventing a movement of the catches from a vertical position in the opposite direction.

In testimony whereof I hereunto affix my signature in the presence of two witnesses.

EDWARD LAWSON.

Witnesses:
 CHAS. COWAN,
 JAS. L. STONE.